G. W. THURMAN.
STOVE AND RANGE.
APPLICATION FILED JAN. 14, 1914.

1,131,573.

Patented Mar. 9, 1915.
2 SHEETS—SHEET 1.

Witnesses
W. S. McDowell
J. W. Garner

Inventor
George W. Thurman
By Victor J. Evans
Attorney

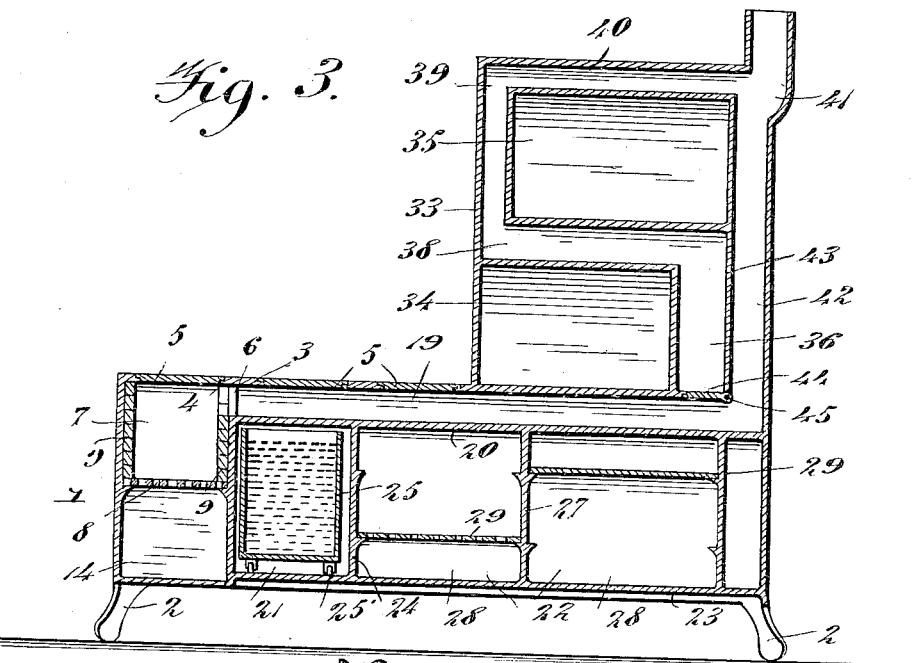
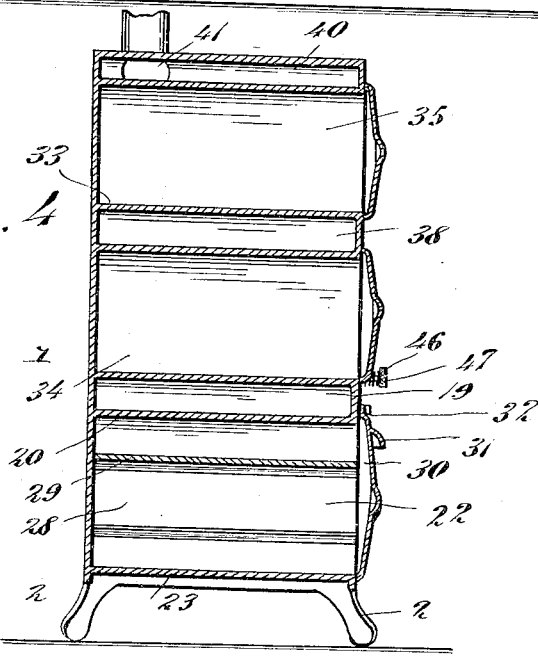

UNITED STATES PATENT OFFICE.

GEORGE W. THURMAN, OF CACHE, OKLAHOMA, ASSIGNOR OF FORTY-EIGHT ONE-HUNDREDTHS TO BENJAMIN H. GOOD, OF CACHE, OKLAHOMA.

STOVE AND RANGE.

1,131,573.

Specification of Letters Patent.

Patented Mar. 9, 1915.

Application filed January 14, 1914. Serial No. 812,099.

*To all whom it may concern:*

Be it known that I, GEORGE W. THURMAN, a citizen of the United States, residing at Cache, in the county of Comanche and State of Oklahoma, have invented new and useful Improvements in Stoves and Ranges, of which the following is a specification.

This invention is an improved cooking and heating stove or range adapted also for baking and roasting and providing a heating or warming oven in addition to baking and roasting ovens and a water heater, the invention consisting in the construction, combination and arrangement of devices hereinafter described and claimed.

The object of my invention is to provide an improved cooking or heating stove or oven in which the heated products of combustion are availed of for heating a plurality of ovens and also for heating water and a heating or warming oven, so that an economy of fuel is effected and the stove or range is adapted for all the uses of an article of this character.

Figure 1:
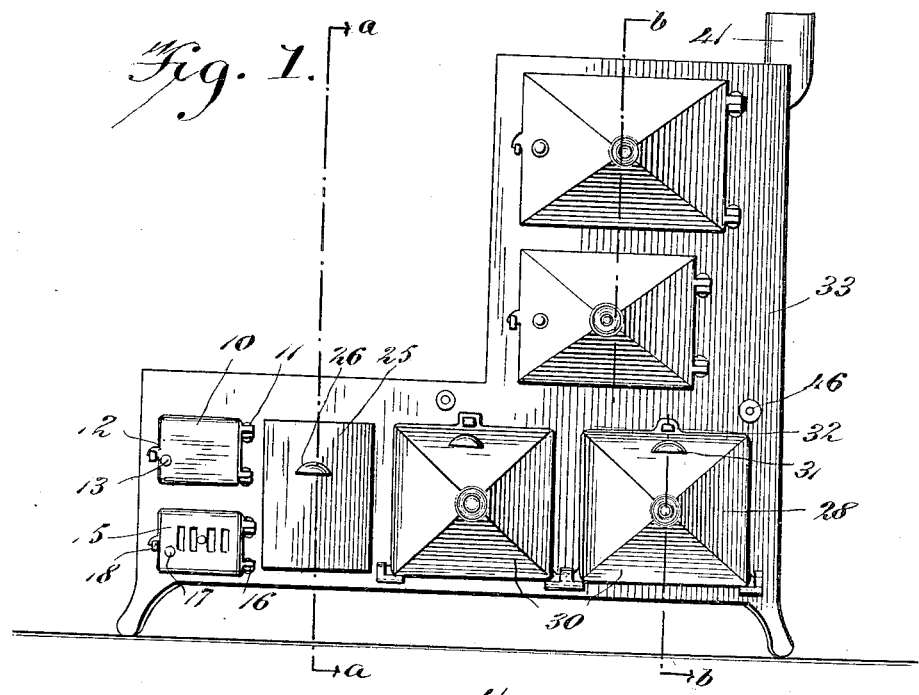
Figure 2:
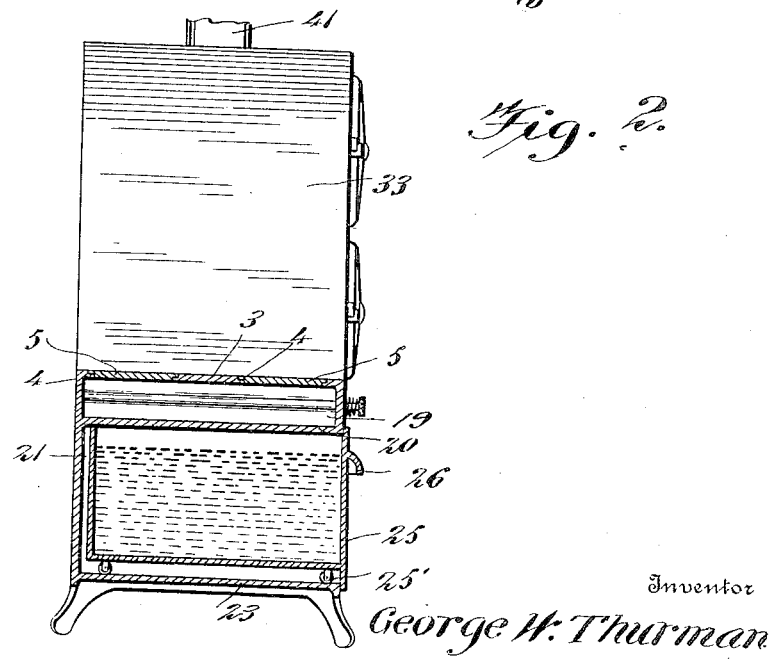

In the accompanying drawings: Figure 1 is a side elevation of a stove or range constructed in accordance with my invention. Fig. 2 is a vertical transverse vertical sectional view of the same on the plane indicated by the line *a—a* of Fig. 1. Fig. 3 is a vertical longitudinal sectional view of the same. Fig. 4 is a vertical transverse sectional view of the same on the plane indicated by the line *b—b* of Fig. 1.

The body 1 of my improved stove or range is of oblong rectangular form and is provided at its corners with suitable supporting legs 2. The front portion of the body of the stove or range is provided with a top 3 having openings 4 and removable covers 5 for the said openings, the top being provided on its under side at a point between the openings with a bridge bar 6 for strengthening the same. At the front end of the body and in the upper portion thereof is a fire box 7, the bottom of which is formed by a grate 8 and the walls of the fire box being provided with suitable bricks 9. At one end of the fire box is a fuel opening which is provided with a fuel door 10, the latter being hinged at one side as at 11 and being provided at its free edge with a suitable latch 12 as well as with a suitable knob or handle 13.

The ash pit 14 below the grate is provided at one end with a door 15 which is hinged at its lower side as at 16 and has a suitable handle 17 and latch 18. The front openings 4 in the top of the stove are directly over the fire box, the rear openings being above a horizontal flue 19 which runs from the fire box to the extreme rear end of the body 1, the bottom of this flue being formed by a horizontally arranged plate 20. This flue is coextensive in width with the space between the vertical side walls of the body.

A water heating chamber 21 is formed next the fire box and ash pit and under the front portion of the flue 19 and a hot oven or warming closet 22 is formed under the rear portion of the said flue 19 and between the latter and the bottom 23 of the stove, this hot oven or warming closet being separated from the water heating chamber 21 by a vertical partition wall 24. The water heating chamber is open at its front side or end and in the same is a hot water reservoir 25 which is of a size and shape adapted to fit in the said chamber, the reservoir being provided at its bottom at its rear end with supporting rollers 25 to bear on the bottom of said chamber and facilitate the movement of the reservoir in and out of the chamber, and being provided at its front end with a suitable handle 26. The front wall of the hot water reservoir closes the opening at the front end of the chamber 21 when the reservoir is in place in such chamber, as indicated in Fig. 1.

The hot oven or warming closet 22 is divided by a vertical partition wall 27 into a pair of chambers or ovens 28 each of which is provided with a removable grate 29 and is open at its front end and provided with a suitable hinged door 30, the doors being provided with suitable knobs or handles 31 and with suitable catches 32.

On the rear portion of the body is a rectangular vertical casing or structure 33 in which a lower oven 34 and an upper oven 35 are formed. The lower oven is directly against the front wall of the casing 33 and is spaced from the rear wall thereof to form a flue 36, which communicates with the flue 19 which is at its lower end. The upper oven is spaced above the lower oven, is directly at the rear wall of the casing and is spaced from the front side thereof so that a return flue 38 is formed between the top of the oven 34 and the bottom of the oven 35.

A vertical flue 39 is formed between the front sides of the casing and the upper oven 35 and the horizontal rearwardly directed flue 40 is formed above the upper oven. This flue 40 discharges at its rear end into the lower end of a smoke pipe connector 41. A vertically arranged direct draft flue 42 is on the rear wall of the casing 33 and is separated by said rear wall 43 from the flue 36, this direct draft flue communicating at its lower end with the rear end of the flue 19 and discharging at its upper end into the smoke pipe connector 41.

A damper 44 is arranged at the rear end of the stove or range and is carried by a pivotal shaft 45 which has a handle 46 at one end and also has a spring 47 the said spring bearing between the handle and one wall of the stove or range and serving to hold the damper in any desired position. This damper enables the flue 19 to be put in communication either with the flue 36 or with the direct flue 42, as may be desired. A damper 48 is also provided for the flue 19 and is arranged above the warming closet 22.

In the operation of my improved stove or range, the heat from the flue 19 and radiated from the fire box serves to heat the water in the reservoir 25 and also to heat the hot oven or warming closet 22. When direct draft is desired the damper 44 is set to close the flue 36 and open the direct draft flue 42. When the ovens are in use, the damper 44 is set to close the direct draft flue and to open the flue 36, the heated products of combustion then passing from the fire box through the flue 19 under the lower oven then up through the flue 36 on the rear side of the lower oven, then forwardly through the return flue 38 between the top of the lower oven and the bottom of the upper oven, then upwardly through the flue 39 on the front side of the upper oven and then rearwardly over the upper oven through the flue 40 and from thence upwardly through the smoke pipe connector 41.

In effect, the flue 19 in connection with the flues 36—38, 39 and 40 forms a tortuous indirect draft flue in the angles of which the ovens are located so that the tortuous flue enables the hot air and heated products of combustion from the fire box to be availed of to heat a series, one or more, any suitable number, of ovens and thus effect a very material economy in fuel.

While I have herein shown and described a preferred form of the invention, I would have it understood that changes may be made in the form, proportion and construction of the several parts without departing from the spirit of the invention and within the scope of the appended claims.

I claim:—

1. The herein described stove comprising a body having a fire box at one end, a flue leading from the fire box rearwardly and directly over the top of the stove, a vertical direct flue at the rear end of the stove and communicating at its lower end with the first named flue, a tortuous flue communicating at its lower end with the first named flue and at its upper end with the direct draft flue, a damper common to the first named flue, the direct draft flue and the tortuous flue to direct the products of combustion either through the direct draft flue or the tortuous flue and ovens arranged in the angles of the tortuous flue, one of said ovens being on the top of the stove and the other being arranged between the tortuous flue and the direct draft flue.

2. The herein described stove comprising a body having a fire box at one end, a flue leading from the fire box rearwardly and directly over the top of the stove a vertical direct flue at the rear end of the stove and communicating at its lower end with the first named flue, a tortuous flue communicating at its lower end with the first named flue and at its upper end with the direct draft flue a damper common to the first named flue, the direct draft flue and the tortuous flue to direct the products of combustion either through the direct draft flue or the tortuous flue and ovens arranged in the angles of the tortuous flue, one of said ovens being on the top of the stove and the other being arranged between the tortuous flue and the direct draft flue, the stove being further provided with an ash pit below the fire box, a water heating compartment next the fire box, and a hot or warm oven next the water heating compartment, said water heating compartment and said hot or warming oven being arranged below the first named flue.

In testimony whereof I affix my signature in presence of two witnesses.

GEORGE W. THURMAN.

Witnesses:
G. W. JAKLE,
E. J. SACKETT.